2,894,016
HETEROCYCLIC PHOSPHORUS-CONTAINING COMPOUNDS AND THEIR PRODUCTION

William M. Lanham, Charleston, W. Va., assignor to Union Carbide Corporation, a corporation of New York No Drawing. Application January 7, 1957
Serial No. 632,666

12 Claims. (Cl. 260—461)

This invention relates to the production of a novel class of heterocyclic phosphorus-containing compounds having at least one phenyl or benzyl radical attached to a corresponding carbon atom or atoms of the heterocyclic ring. Such compounds have structures corresponding to the formula

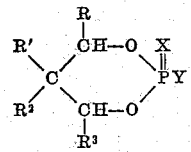

wherein R designates a member of the class consisting of hydrogen and the phenyl and lower alkyl radicals; R' designates a member of the class consisting of hydrogen, chlorine, bromine, and the phenyl and benzyl radicals; R² designates a member of the class consisting of hydrogen, chlorine, bromine, and the lower alkyl radicals; R³ designates a member of the class consisting of hydrogen and the phenyl radical; and at least one of the members of the group R, R' and R³ is an aryl hydrocarbon substituent; X is a member of the class consisting of oxygen and sulfur; Y is a member of the class consisting of the chlorine, bromine, fluorine and mercapto radicals; and when Y is mercapto, X represents sulfur.

The novel compounds wherein Y represents a halogen are good insecticides, that produced in Example II herein being a particularly potent insecticide. Moreover, the novel compounds of the invention wherein Y is mercapto and X represents sulfur are useful intermediates for the production of various new compounds by reaction with aldehydes, ethylenically unsaturated carboxylic acids, esters and amides, epoxides, alpha,beta-olefinically unsaturated ketones, ethers, etc., having utility as insecticides. These compounds of the invention also have utility as promoters in the flotation of sulfide ores, and as lubricating oil additives. The new compounds wherein Y is chlorine, bromine and fluorine also react with aliphatic alcohols, phenols, and the alkali metal salts of alcohols and phenols, amines, and ammonia to produce neutral esters which are useful as pesticides, corrosion inhibitors, and petroleum oil additives. Thus, 5,5-dichloro - 2 - ethoxy - 2 - oxo - 4 - phenyl - 1,3,2 - dioxaphosphorinane was effective against Mexican bean beetle larvae when an aqueous solution containing 50 mg. of the compound per 100 cc. of the solution was sprayed upon bean plants which were then infested with the larvae and exposed for 72 hours.

The compounds of the invention wherein Y represents a mercapto group and X represents sulfur are relatively strong acids, and are valuable intermediates for the production of various neutral compounds useful as pesticides, plasticizers, lubricating oil additives, etc. by reacting such compounds with alpha,beta-olefinically unsaturated esters, ethers, ketones, amides and with epoxides and aldehydes. Moreover, the compounds are useful as intermediates for the production of the aryl-substituted heterocyclic thiophosphoryl halides of this invention according to the equation:

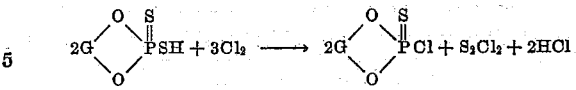

where G is the hydrocarbon residue of an aryl-substituted 1,3-alkanediol.

The novel compounds of the invention where Y represents a halogen can be prepared by reacting a phosphoryl halide or a thiophosphoryl halide with an aryl-substituted alkane-1,3-diol of the structure $$HOCH(R)CR'R^2CHR^3OH$$

wherein R, R', R² and R³ have the meanings previously indicated. Representative aryl-substituted alkane-1,3-diols useful as starting materials in the process of this invention include, among others:

1-phenyl-1,3-propanediol
1-phenyl-1,3-butanediol
1-phenyl-1,3-decanediol
1-phenyl-1,3-hexanediol
2-ethyl-1-phenyl-1,3-butanediol
2-n-butyl-1-phenyl-1,3-butanediol
2-n-heptyl-1-phenyl-1,3-butanediol
2-benzyl-1-phenyl-1,3-butanediol
1,3-diphenyl-2-ethyl-1,3-propanediol
1,3-diphenyl-1,3-propanediol
2,2-dichloro-1-phenyl-1,3-propanediol
2-phenyl-1,3-propanediol
2-benzyl-1,3-propanediol
2-methyl-2-phenyl-1,3-propanediol
2-ethyl-2-phenyl-1,3-propanediol
2-butyl-2-phenyl-1,3-butanediol
2-methyl-2-phenyl-1,3-hexanediol
1-(2,4,6-trimethylphenyl)-1,3-butanediol
2-ethyl-1-phenyl-1,3-hexanediol
2-butyl-1-phenyl-1,3-octanediol
2-heptyl-1-phenyl-1,3-hexanediol
2-benzyl-1-phenyl-1,3-hexanediol The diprimary aryl-substituted alkane-1,3-diols used as starting materials in the process of the invention can be made in well known manner, as for example, by the method disclosed by Atkins et al. in Jour. Am. Chem. Soc., vol. 70, p. 3121, involving the hydrogenation of an ester of an aryl-substituted malonic acid in the presence of a Raney nickel catalyst at around 150° C. and pressures around 5000 p.s.i.

The aryl-substituted alkane-1,3-diols having both a primary hydroxyl and a secondary hydroxyl group, or having two secondary hydroxyl groups, useful as starting materials in the process, can be made by the process described by Sprague et al. in Jour. Am. Chem. Soc., vol. 56, pp. 2669–75 (1934), involving the hydrogenation and hydrogenolysis of 1,3-diketones in dry ether with a Raney nickel catalyst under 150–200 atmospheres' pressure, at temperatures ranging from 50–60° C. to 125° C.

The novel compounds of the invention wherein X represents sulfur and Y represents the mercapto radical can be prepared by reacting phosphorus penta sulfide with one of the before described aryl-substituted alkane-1,3-diols according to the equation:

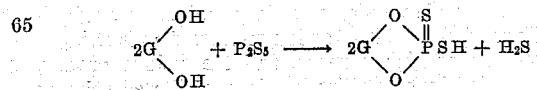

wherein G represents the diol residue. In the production of these compounds where Y is a mercaptan radical it is customary to add slowly through a funnel the stoichiometric amount of powdered phosphorus pentasulfide to an agitated solution of the diol dissolved in xylene. However, the diol can be added to a suspension of the phosphorus pentasulfide in xylene. An excess of either reactant can be used without adverse effect. While reaction temperatures within the range from 25° to 125° C. are operative it is preferred to conduct the reaction at around 100° to 115° C. At temperatures above 125° C. side reactions can occur to an objectionable extent. When the reaction is complete the reaction mixture becomes homogeneous and evolution of hydrogen sulfide ceases. The desired product can be purified by crystallizing from xylene, toluene or ethyl ether; or by preparing an aqueous solution of an alkali metal salt of the acid by reaction with an alkali metal hydroxide or carbonate, and filtering the solution, or extracting it with toluene, and then regenerating the desired product by the addition of a mineral acid such as hydrochloric acid.

The compounds of the invention wherein X represents sulfur or oxygen and Y represents a halogen can be made by reacting phosphoryl chloride or thiophosphoryl chloride, or the corresponding bromide or fluoride with one of the aforesaid aryl-substituted alkane-1,3-diols according to one of the equations.

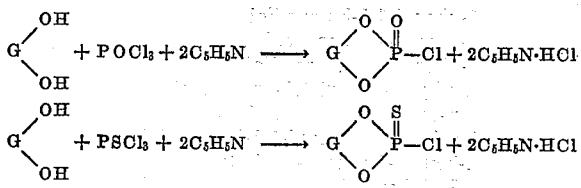

When using a thiophosphoryl halide as a reactant the preferred procedure is to add the diol, in solution in an inert solvent where the diol is a solid, dropwise into an agitated solution of an equimolar quantity of the thiophosphoryl halide in an inert solvent such as benzene, and the stoichiometric amount of a tertiary amine such as pyridine or triethylamine. Preferably reaction temperatures around 40° C. are used but temperatures around 25° to 60° C. are operative. However, the thiophosphoryl halide can be added dropwise to an agitated solution of the diol in the pyridine and benzene. The reaction mixture then is filtered and washed with water to remove the last traces of the amine hydrochloride by-product. In this manner a substantially pure residue product is secured in high yield. If desired, this product can be distilled under high vacuum, using a falling film type still.

In the production of those compounds of the invention where X is oxygen and Y is a halogen, the reaction preferably is conducted at —5° to —10° C. by the addition of the diol, in solution in a solvent such as ethyl ether, to an equimolar quantity of a phosphoryl halide in the stoichiometric amount of pyridine and ethyl ether. If desired, the phosphoryl halide can be added dropwise to an agitated solution of the diol in pyridine and ethyl ether. Reaction temperatures in the range from around —50° C. to around +50° C. are operative. In place of ethyl ether any inert solvent can be used, such as ethylene dichloride, benzene, heptane, etc. These products are solids, and can be purified by crystallization. However, it is desirable first to remove the last traces of the amine hydrochloride by-product by washing with cold water.

If desired, the phosphoryl halide can be added dropwise to a suspension of the diol in a volatile solvent such as benzene, ethyl ether, or a mixture thereof, while under vacuum, in the absence of a tertiary amine, as exemplified in Example IV. The reaction mixture then is stripped of solvent under high vacuum, and the residue product can be purified by crystallization from a filtered solution thereof in a volatile solvent such as a mixture of benzene and ethyl ether.

The following examples will serve to illustrate the invention.

*Example I*

To an agitated solution consisting of 0.5 mol of thiophosphoryl chloride, 1.0 mol of pyridine and 500 cc. of benzene held at 40° C. there were added dropwise during twenty minutes 0.5 mol of 1-phenyl-1,3-propanediol. After holding the reaction mixture at 40° C. for an additional two hours and allowing it to set overnight at 25° C. it was filtered, and the resulting filtrate was washed with cold (10° C.) water, dried over calcium sulfate and filtered. This latter filtrate was stripped by distillation to a kettle temperature of 50° C. under less than 2 mm. of mercury pressure. There was thus obtained 110.5 grams of 2-chloro-4-phenyl-2-thiono-1,3,2-dioxaphosphorinane in the form of a yellow liquid residue having the following properties: percent purity (by esterification) 96.3; $n30/D=1.5852$. It had the following analysis, in percent by weight: $P=12.19$; $S=12.0$; $C=45.67$; $H=4.66$; percent yield, based upon the phosphoryl-containing reactant=89.

*Example II*

To an agitated solution consisting of 0.241 mol of 2-methyl-2-phenyl-1,3-propanediol, 125 grams of benzene, 150 cc. of ethylene dichloride, and 0.50 mol of pyridine, held at 40° C. there were added dropwise during fifteen minutes 0.241 mol of thiophosphoryl chloride. After an additional two hours at 40° C. the reaction mixture was cooled to 10° C., filtered, and the residue washed with ethyl ether. The filtrate and ether washings were mixed and the mixture was washed with dilute aqueous sodium bicarbonate, washed with water until only slightly basic toward litmus, dried over calcium sulfate, cooled to —10° C. and filtered. The filtrate was stripped by distillation at 25° C. under 10 mm. of mercury, and the mushy solid thus obtained was dissolved in ethyl ether, cooled to —40° C. and filtered. These two crystallizations yielded a waxy solid which, after stripping at 50° C. under less than 1 mm. of mercury, yielded 36.5 grams of a dry, white solid, of which 27 grams was dissolved in a mixture of 125 cc. benzene and 100 cc. ethyl ether and recrystallized by cooling to —40° C. There was thus obtained 15 grams of 2-chloro-5-methyl-5-phenyl-2-thiono-1,3,2-dioxaphosphorinane as a white solid having the following analysis percent by weight: $P=11.66$ (theoretical=11.79); $S=12.07$ (theoretical=12.21); $Cl=13.37$ (theoretical=13.50); $C=46.11$ (theoretical=45.73); $H=4.62$ (theoretical=4.61).

The filtrate from the latter crystallization was stripped by distillation at 50° C. under less than 1.2 mm. of mercury, yielding an additional 12 grams of the aforesaid compound as a white solid still residue having the following properties:

Percent purity (by esterification)=98.4; and the following analysis, in percent by weight: $P=11.61$; $S=12.38$; $C=46.55$; $H=4.73$.

This last-named product was highly effective in the control of bean aphids, permitting a 95 to 100% control thereof upon spraying nasturtium plants infested with the bean aphids with an aqueous solution containing 35 mg. of the compound per 100 cc. of the aqueous solution. It was likewise highly effective in the control of red spider mites and of army worms.

*Example III*

To an agitated solution consisting of 0.66 mol of phosphoryl chloride, 1.32 mols of pyridine and 500 cc. of ethyl ether held at —5° to —10° C. there were added dropwise during twenty minutes a solution of 0.66 mol of 1-phenyl-1,3-propanediol in 100 cc. of ethyl ether. After allowing the reaction mixture to stand overnight at 25° C. it was filtered, and the residue was agitated in 1.5 liters of ethylene dichloride and filtered. The 181 grams of residue was washed with 500 cc. of ethylene dichloride and again filtered. The filtrates from the latter two filtrations were composited, and most of the ethylene dichloride was removed by distillation at 25° C. under less than 20 mm. of mercury. The distillation residue subsequently was filtered at −25° C. The resultant white solid residue was added to 200 cc. of ethyl ether and filtered at 10° C., and a 58 gram portion of the resultant white residue was dissolved in 400 grams of ethyl dichloride, washed with 5° C. water, dried over calcium sulfate, filtered, and stripped by distillation at 25° C. under less than 2 mm. of mercury. The residue was washed at 25° C. with ethyl ether, filtered, and air dried to yield 2-chloro-2-oxo-4-phenyl-1,3,2-dioxaphosphorinane as a white solid having the following properties:

Percent purity (by saponification)=99.2; melting point=112–113° C. (with decomposition); and the following analysis, in percent by weight: P=13.16 (theoretical=13.32); Cl=14.44 (theoretical=13.32); C=45.94 (theoretical=46.49); H=4.16 (theoretical=4.34).

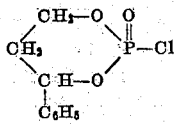

*Example IV*

To an agitated suspension of 0.241 mol of 2-methyl-2-phenyl-1,3-propanediol in 150 grams of benzene and 70 grams of ethyl ether maintained at 25° C. under 500 mm. of mercury pressure there were added dropwise during twenty-eight minutes 0.241 mol of phosphoryl chloride. After heating the reaction mixture momentarily to 35° C. it was maintained at 25° C. for 1.5 hours under 500 mm. of mercury, then for an hour under 350 mm. pressure and finally for an hour at less than 5 mm. of mercury, all at 25° C. After stripping the reaction mixture by distillation to a kettle temperature of 50 C. under less than 2 mm. of mercury the brown, mushy solid still residue was dissolved in 100 cc. benzene at 40° C., diluted with 50 cc. ethyl ether, cooled to −20° C. and filtered. The filtrate was stripped by distillation at 40° C. under 20 mm. of mercury, cooled to −30° C. and filtered. The two filtrations yielded a white solid residue which, after stripping by distillation at 50° C. under less than 1 mm. of mercury yielded 40 grams of 2-chloro-5-methyl-2-oxo-5-phenyl-1,3,2-dioxaphosphorinane as a white solid having the following properties:

Melting point=64–67° C.; salt content=0.03 cc. of normal HClO₄/g.; and the following analysis in percent by weight: P=12.38 (theoretical=12.56); Cl=13.86 (theoretical=14.38); C=48.88 (theoretical=48.72); H=4.69 (theoretical=4.91); percent yield (based on the phosphoryl chloride)=67.

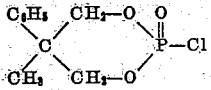

This is a highly effective insecticide in the control of bean aphids.

*Example V*

During fifteen minutes 0.2 mol of phosphorus pentasulfide was added in small successive portions to an agitated solution of 0.4 mol of 2,2-dichloro-1-phenyl-1,3-propanediol in 150 cc. of xylene held at 100° C. After holding the reaction mixture at 100° to 115° C. for an additional six hours the evolution of hydrogen sulfide had ceased. The reaction mixture was filtered at 115° C. and the filtrate was cooled to 0° C. and again filtered. The light brown residue from the latter filtration was suspended in 150 cc. ethyl ether, cooled to 0° C. and filtered. The resulting residue was stripped by distillation at a kettle temperature of 25° C. under less than 20 mm. of mercury, yielding 5,5-dichloro-2-mercapto-4-phenyl-2-thiono-1,3,2-dioxaphosphorinane in the form of a tan solid residue having the following properties: percent purity (by acidity determination)=99.5; melting point=134–137° C. It had the following analysis in percent by weight: P=10.08 (theoretical=9.83); Cl=22.10 (theoretical=22.48); S=20.2 (theoretical=20.33); C=34.41 (theoretical=34.30); H=3.98 (theoretical=2.88).

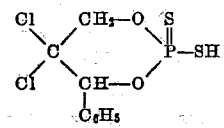

*Example VI*

2-mercapto-5-methyl-5-phenyl-2-thiono-1,3,2-dioxaphosphorinane was prepared by the intermittent addition of .22 g. (0.1 mol) of phosphorus pentasulfide to an agitated solution of 33 g. (0.2 mol) of 2-methyl-2-phenyl-1,3-propanediol in 200 cc. of toluene over a period of 14 minutes. It was necessary to heat the reaction mixture throughout this addition in order to maintain the reaction temperature at 70° C. After the addition the reaction mixture was kept at 70–87° C. for an additional 8 hours, at which time the reaction mixture was homogeneous and hydrogen sulfide was no longer being evolved. The reaction mixture was cooled to −40° C. and filtered. The residue was agitated in 300 cc. of ethyl ether, cooled to −40° C., filtered, and the resulting residue was stripped at 50° C. under less than 2 mm. of mercury. There was thus obtained 31 g. of 2-mercapto-5-methyl-5-phenyl-2-thiono-1,3,2-dioxaphosphorinane as a white solid still residue which had the following properties: equivalent weight (by acidity determination)=247.7 (theory=260.3), M.P.=136–138° C. It had the following analysis: P=11.96 (theory=11.90); percent S=24.16 (theory=24.62); percent C=46.80 (theory=46.12); percent H=4.74 (theory=5.03).

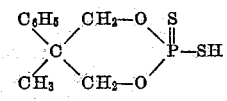

*Example VII*

To an agitated suspension of 0.25 mol of 2,2-dichloro-1-phenyl-1,3-propanediol in 400 cc. of benzene and 0.506 mol of pyridine held at 25° C. there were added during fifteen minutes dropwise 0.25 mol of phosphoryl chloride. After an additional exposure at 25° C. for 64 hours the reaction mixture was filtered and the solid residue was washed with 5° C. water until free from the chloride ion, and was then washed with ethyl ether and then stripped by distillation at a kettle temperature of 25° C. under less than 2 mm. of mercury. Thus was obtained a 49% yield of 2-oxo-4-phenyl-2,5,5-trichloro-1,3,2-dioxaphosphorinane in the form of a white solid powder melting at 159–172° C., and having the following analysis, in percent by weight: P=10.07; Cl=33.05; C=35.62; H=2.75.

By the practice of this invention there has now been made available for use as pesticides, as intermediates for the preparation of plasticizers for synthetic resins, including polyvinyl chlorides and vinyl chloride-containing polymers, and as corrosion inhibitors, petroleum additives and flotation agents, a novel class of high boiling heterocyclic phosphorus-containing compounds having at least one phenyl or benzyl radical connected with a carbon atom or atoms of the heterocyclic ring, which class of compounds offers the advantages over aliphatic heterocyclic phosphorus-containing compounds in that they are particularly resistant toward hydrolysis as evidenced by the fact that they can be washed with water.

The invention is susceptible of modification within the scope of the appended claims.

What is claimed is:

1. As new compounds, aryl hydrocarbon-substituted heterocyclic phosphorus-containing compounds having at least one aryl hydrocarbon residue attached to a corresponding carbon atom of the heterocyclic ring, and having the structure

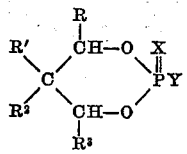

wherein R designates a member of the class consisting of hydrogen and the phenyl and lower alkyl radicals; R' designates a member of the class consisting of hydrogen, chlorine, bromine, and the phenyl and benzyl radicals; R² designates a member of the class consisting of hydrogen, chlorine, bromine, and the lower alkyl radicals; R³ designates a member of the class consisting of hydrogen and the phenyl radical; and at least one of the R, R' and R³ is an aryl-hydrocarbon substituent; X is a member of the class consisting of oxygen and sulfur; and Y is a member of the class consisting of the chlorine, bromine, and mercapto radicals; and when Y is mercapto, X represents sulfur.

2. As new compounds, aryl hydrocarbon-substituted heterocyclic phosphorus-containing chlorides having at least one aryl hydrocarbon residue attached to a carbon atom of the heterocyclic ring, and having the structure

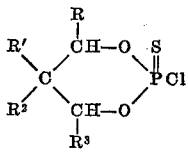

wherein R designates a member of the class consisting of hydrogen and the phenyl and lower alkyl radicals; R' designates a member of the class consisting of hydrogen, chlorine, bromine, and the phenyl and benzyl radicals; R² designates a member of the class consisting of hydrogen, chlorine, bromine, and the lower alkyl radicals; R³ designates a member of the class consisting of hydrogen and the phenyl radical; and at least one of the R, R', and R³ is an aryl-hydrocarbon substituent.

3. As new compounds, aryl hydrocarbon-substituted heterocyclic phosphorus-containing chlorides having at least one aryl hydrocarbon residue attached to a carbon atom of the heterocyclic ring, and having the structure

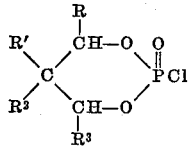

wherein R designates a member of the class consisting of hydrogen and the phenyl and lower alkyl radicals; R' designates a member of the class consisting of hydrogen, chlorine, bromine, and the phenyl and benzyl radicals; R² designates a member of the class consisting of hydrogen, chlorine, bromine, and the lower alkyl radicals; R³ designates a member of the class consisting of hydrogen and the phenyl radical; and at least one of the R, R', and R³ is an aryl hydrocarbon substituent.

4. As new compounds, aryl hydrocarbon-substituted heterocyclic phosphorus-containing compounds having at least one aryl hydrocarbon residue attached to a corresponding carbon atom of the heterocyclic ring, and having the structure

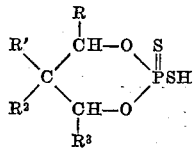

wherein R designates a member of the class consisting of hydrogen and the phenyl and lower alkyl radicals; R' designates a member of the class consisting of hydrogen, chlorine, bromine and the phenyl and benzyl radicals; R² designates a member of the class consisting of hydrogen, chlorine, bromine, and the lower alkyl radicals; R³ designates a member of the class consisting of hydrogen and the phenyl radicals; and at least one of the members of the group R, R' and R³ is an aryl hydrocarbon substituent.

5. Process for making aryl hydrocarbon-substituted heterocyclic phosphorus-containing compounds which comprises reacting (1) a phosphorus compound of the class consisting of phosphorus pentasulfide, phosphoryl chloride, phosphoryl bromide, thiophosphoryl chloride, and thiophosphoryl bromide with (2) an aryl-substituted alkane-1,3-diol having the structure

HOCHRCR'R²CHR³OH wherein R is of the class consisting of hydrogen and the phenyl and lower alkyl radicals; R' is of the class consisting of hydrogen, chlorine, bromine, and the phenyl and benzyl radicals; R² is of the class consisting of hydrogen, chlorine, bromine, and the lower alkyl radicals; and R³ is of the class consisting of hydrogen and the phenyl radicals; and at least one of the R, R' and R³ is an aryl-hydrocarbon substituent; and separately recovering from the resultant reaction mixture the said aryl hydrocarbon-substituted heterocyclic phosphorus-containing compound thus produced.

6. Process for making aryl hydrocarbon-substituted heterocyclic aliphatic phosphates, which comprises reacting thiophosphoryl chloride at temperatures within the range of from 25° to 60° C., with an aryl-substituted alkane 1,3-diol having the structure

HOCHRCR'R²CHR³OH wherein R is of the class consisting of hydrogen and the phenyl and lower alkyl radicals; R' is of the class consisting of hydrogen, chlorine, bromine and the phenyl and benzyl radicals; R² is of the class consisting of hydrogen, chlorine, bromine, and the lower alkyl radicals; R³ is of the class consisting of hydrogen and the phenyl radical; and at least one of the R, R' and R³ is an aryl hydrocarbon substituent; and separately recovering from the resultant reaction mixture the aryl hydrocarbon-substituted heterocyclic halothiono phosphate thus produced.

7. Process for making aryl hydrocarbon-substituted heterocyclic phosphorus-containing compounds which comprises reacting phosphoryl chloride, at temperatures within the range of from around −50° C. to around +50° C., with an aryl-substituted alkane-1,3-diol having the structure HOCHRCR'R²CHR³OH wherein R is of the class consisting of hydrogen and the phenyl and lower alkyl radicals; R' is of the class consisting of hydrogen, chlorine, bromine, and the phenyl and benzyl radicals; R² is of the class consisting of hydrogen, chlorine, bromine, and the lower alkyl radicals; and R³ is of the class consisting of hydrogen and the phenyl radical; and at least one of the R, R' and R³ is an aryl-hydrocarbon substituent; and separately recovering from the resultant reaction mixture the said aryl hydrocarbon-substituted heterocyclic phosphorus-containing compound thus produced.

8. Process for making aryl hydrocarbon-substituted heterocyclic dithiophosphoric acids, which comprises reacting phosphorus pentasulfide at temperatures within the range of from 25° to 125° C. with an aryl-substituted alkane 1,3-diol, having the structure

HOCHRCR'R²CHR³OH wherein R is of the class consisting of hydrogen and the phenyl and lower alkyl radicals; R' is of the class consisting of hydrogen, chlorine, bromine, and the phenyl and benzyl radicals; R² is of the class consisting of hydrogen, chlorine, bromine, and the lower alkyl radicals; and R³ is of the class consisting of hydrogen and the phenyl radical; and at least one of the R, R' and R³ is an aryl-hydrocarbon substituent; and separately recovering from the resultant reaction mixture the said aryl hydrocarbon-substituted heterocyclic dithiophosphoric acid thus produced.

9. As a new compound, 2-chloro-5-methyl-5-phenyl-2-thiono-1,3,2-dioxaphosphorinane.

10. As a new compound, 2-chloro-4-phenyl-2-thiono-1,3,2-dioxaphosphorinane.

11. As a new compound, 5,5-dichloro-2-mercapto-4-phenyl-2-thiono-1,3,2-dioxaphosphorinane.

12. As a new compound, 2-mercapto-5-methyl-5-phenyl-2-thiono-1,3,2-dioxaphosphorinane.

No references cited.